United States Patent [19]

Banner et al.

[11] Patent Number: 4,755,392

[45] Date of Patent: * Jul. 5, 1988

[54] FOOD COATING COMPOSITIONS

[75] Inventors: Beatrice A. Banner, West Hill; Lucy V. Richardson, Toronto; Kenneth S. Darley, Whitby, all of Canada

[73] Assignee: The Griffith Laboratories, Limited, Scarborough, Canada

[*] Notice: The portion of the term of this patent subsequent to Jun. 23, 2004 has been disclaimed.

[21] Appl. No.: 1,957

[22] Filed: Jan. 9, 1987

Related U.S. Application Data

[63] Continuation of Ser. No. 701,162, Feb. 13, 1985, Pat. No. 4,675,197.

[30] Foreign Application Priority Data

Feb. 13, 1984 [GB] United Kingdom ................. 8403675

[51] Int. Cl.$^4$ ................................................ A23P 1/08
[52] U.S. Cl. ..................................... 426/555; 426/128
[58] Field of Search ............... 426/555, 303, 302, 291, 426/292, 293, 289, 273, 96, 94, 89, 295, 296, 92, 106, 108, 119, 128

[56] References Cited

U.S. PATENT DOCUMENTS

| | | | |
|---|---|---|---|
| 3,656,969 | 4/1972 | Horn | 426/291 |
| 4,423,078 | 12/1983 | Darley et al. | 426/518 |
| 4,529,607 | 7/1985 | Lenchen et al. | 426/94 |
| 4,675,197 | 6/1987 | Banner | 426/292 |

Primary Examiner—Donald E. Czaja
Assistant Examiner—Carolyn Paden
Attorney, Agent, or Firm—Sim McBurney

[57] ABSTRACT

Frozen food products are coated with a novel coating composition which permits the food product to be reconstituted for consumption by the application of microwave energy and obtain the desired combination of textural properties, both of moistness of food substrate and crispness of coating. The coating composition comprises three components, namely a predust component applied to the food substrate, a batter component next applied to the food substrate, and finally a breading component. In the coating composition, the components adjacent the food portion coagulate during cooking and retard the migration of moisture from the food portion to the breading component while, at the same time, providing a controlled porosity to the exterior of the coated food substrate to permit migration of moisture and moisture vapor through the coating to the external environment.

3 Claims, No Drawings

FOOD COATING COMPOSITIONS

This is a continuation of application Ser. No. 701,162 filed Feb. 13, 1985, now U.S. Pat. No. 4,675,197.

FIELD OF THE INVENTION

The present invention relates to food coating compositions, in particular to microwaveable food products coated thereby.

BACKGROUND TO THE INVENTION

Battered and breaded food portions, which may be fish, seafood, poultry, red meat or vegetables, are commonly-known food products served in the home, in restaurants and in institutions. Traditionally, these items are provided to the customer in a form which is raw, partially- or fully-cooked, battered and/or breaded, and frozen. Such products normally are produced by the application of batters and/or breadings to raw or to raw-frozen or to cooked-frozen substrates, subjecting the battered and/or breaded substrates to a blanch frying treatment, refreezing the portions, and packaging the refrozen products in suitable containers. Such products have been traditionally cooked or heated for consumption in the home, restaurant or institution by either deep-frying or oven heating. These food products, when reconstituted for consumption by the latter methods, have offered attractively-coloured portions with moist meat and crisp coating textures.

In recent years, the use of microwave ovens in homes, restaurants and institutions has shown considerable growth, but the variety of foods which can be satisfactorily cooked in microwave ovens is limited. The limitation is most critical for foods which are to present combined textural features, such as both moistness and crispness, within a portion. Such limitations have prevented the availability of a battered and breaded food portion which possesses the desirable crispness within the breading and the desirable moistness within the substrate fish, meat or vegetable. Although food products are available in the marketplace which are indicated to be microwaveable, none possess the desirable combination of crispness and moistness in the cooked product.

This limitation on microwave oven reconstitution or cooking of food arises mainly from very rapid thawing of the ice in the frozen portion to water, the nearly-immediate generation of steam from water within the food portion, and the passage of this steam to and/or through the batter/breading coating, during the microwave application. The rapid release of water and water vapour and their passage to the batter/breading coating before the coating is cooked and made crisp by the microwave heating, results in the formation of a soggy, gummy, tough eating quality which is undesirable.

These problems and effects do not arise with deep frying and oven heating reconstitution, which is effected by external heating and results in cooking of the batter/breading coating before substantial moisture evaporation occurs within the food portion.

SUMMARY OF INVENTION

In accordance with the present invention, there is provided a food-coating composition suitable for application to a food substrate to provide a battered/breaded food portion which is microwaveable to form, when prepared for final consumption by heating in a microwave oven, a cooked food portion which possesses the desirable combination of textural qualities of moistness in the substrate and crispness in the coating.

By the present invention, therefore, the limitation of microwave reconstitution of battered and breaded food portions is overcome. The invention is applicable to any food substrate, including fish, seafood, poultry, red meat, fruit and vegetables.

The coating systems which are used in this invention effectively control moisture migration between the substrate food and the coating system components. Components of the coating adjacent the food portion effectively gel or coagulate during cooking and retard the migration of moisture from the food portion to the breading component while, at the same time, providing a controlled porosity to the exterior of the coated food portion, to permit migration of moisture and moisture vapour through the coating to the external environment. This combination of effects permits the formation of a finished food product which possesses the desired level of moistness within the food substrate and the desired level of crispness within the coating.

GENERAL DESCRIPTION OF INVENTION

The predust layer comprises a finely-divided particulate mixture of components adhered to the surface of the food substrate and assists in adhesion of the batter layer to the food substrate. The particulate mixture generally has a particle size such that none of the particles is coarser than 16 mesh and up to about 40% pass an 80 mesh screen.

The predust mixture contains about 1 to about 10 wt.% of powdered egg albumen or other food binder, for example, gelatin or starch, to provide adhesion for the other components. The balance of the predust mixture consists substantially or completely of powdered high density breadcrumbs with or without flour, commonly soft wheat flour. Commonly the predust contains seasoning, for example, peppers and spices, to provide a desired flavour, but this is not essential.

The powdered breadcrumbs employed in the predust layer are high density breadcrumbs having a bulk density of about 0.5 to about 0.75 g/cc, preferably about 0.55 to about 0.66 g/cc. These materials have a total absorption of about 375 to about 500, preferably about 425 to about 475, an absorption rate of about 15 to about 60 seconds, and a moisture content of about 6 to about 10 wt.%, preferably about 7 to about 9 wt.%.

The "absorption rate" for the breadcrumbs is determined by a standard procedure wherein 30 g of sample are added to 75 mls of water at room temperature, timing is started, the mixture is stirred for 15 seconds and the time required to absorb all the water is the absorption rate.

The "Total Absorption" for the breadcrumbs also is determined by a standard procedure wherein 30 g of sample are added to 300 mls of water at room temperature, the mixture is allowed to stand for 6 hours, the excess water is poured off and the total absorption is determined from the relationship: W $$\text{Total Absorption} = \frac{\text{Total volume of water} - \text{volume of free water}}{\text{wt of sample}} \times 100.$$

Although the powdered breadcrumbs alone may be used in conjunction with the egg albumen, usually fine flour, preferably soft wheat flour, is used in conjunction with the breadcrumbs, in an amount up to about 60 wt.% of the predust composition. In a preferred embodiment of the invention, the predust composition comprises a finely-divided mixture of egg albumen, high density breadcrumbs and soft wheat flour.

The batter layer used in the present invention may be provided by dispersing batter-making components in water in any desired proportions to provide a consistency such as permits a coating to be applied to predusted food. Generally, about 85 to about 125 parts by weight of water are used for 100 parts by weight of batter-forming components.

The batter-making components comprise flour, corn starch, solid chemical leavening agents which react together when wetted, and heated if necessary, to form carbon dioxide to produce leavening of the batter, and plastic fat (i.e. a fat having plasticity as a result of the presence of liquid), and usually also contains powdered egg albumen. The batter-making components often are provided in the form of a dry mix of at least the flour, corn starch and leavening agents, along with powdered egg albumen, if employed. Depending on the form of the plastic fat, this component may be present in the dry mix or may be separately dispersed in the wetted batter.

The corn starch usually is employed in an amount of about 10 to about 40 wt.% of the batter-forming components while the flour, which may be soft and/or hard wheat flour, usually is employed in an amount of about 40 to about 70 wt.% of the batter-forming components. Preferably, the corn starch is employed in an amount of about 20 to about 30 wt.%, the flour is employed in an amount of about 50 to about 60 wt.%, and the weight ratio of flour to corn starch is about 2:1.

The chemical leavening agents usually are present in a total amount of about 1 to about 5 wt.% of the dry mix. One chemical leavening agent usually is sodium bicarbonate in an amount of about 0.5 to about 2.5 wt.% while the acidic component, also in an amount of about 0.5 to about 2.5 wt.%, may be anhydrous monocalcium phosphate, sodium aluminum phosphate, sodium aluminum pyrophosphate, or blends of two or more of these materials.

The plastic fat usually is present in wetted batter in an amount of about 4 to about 10 wt.%. The plastic fat may be creamed prior to dispersion in the batter or may be in powdered form in the dry mix. The plastic fat may have a wide range of Solid Fat Index (SFI) with values ranging:

at 10° C.—up to about 75%
at 27° C.—about 15 to about 75%
at 40° C.—about 5 to about 45%.

Values at the low end of these ranges are preferred for creamed fats while values at the upper end of these ranges are preferred for powdered fats. A variety of commercially-available vegetable oil shortenings corresponding to these characteristics may be employed.

When employed in the batter composition, powdered egg albumen usually is present in the dry mix in an amount of up to about 6 wt.% of the dry mix. It is usual to incorporate seasoning in the batter to impart a desired flavour thereto, but the seasoning may be omitted, if desired. Seasoning includes pepper, spices, powdered lemon juice and similar materials. Small amounts of finely-divided protein, for example, soya flour, also may be present in the batter.

The outer breading layer applied to the batter layer is formed of low density and coarse breadcrumbs to provide a crispy or crunchy texture to the reconstituted food product. The breadcrumbs used are coarse and usually are sized so that at least about 15 wt.% of the crumb is retained on an 8 mesh screen. A preferred particle size distribution is as follows:

| Mesh size | Wt. % |
| --- | --- |
| +3 | 0 |
| +5 | 0 to about 15 |
| +8 | about 20 to 40 |
| +14 | about 25 to 40 |
| +20 | about 10 to 30 |
| +40 | 0 to about 15 |
| −40 | max 10. |

The breadcrumbs used are of low density and usually have a bulk density of about 0.20 to about 0.40 g/cc, preferably about 0.23 to about 0.36 g/cc.

The breadcrumbs may contain small quantities of components to impart colour to the reconstituted food product and/or to affect the browning rate upon reconstitution. For example, up to about 0.1 wt.% of caramel colouring agent may be present while up to about 2 wt.% dextrose also may be present as a browning rate control agent.

Depending on the flavour desired for the end product, salt in varying quantities may be present in the breadcrumbs, usually in a quantity of 0 to about 5 wt.%, preferably about 0.5 to about 1.5 wt.%.

The breading crumbs employed are preferably oriental-style breading crumbs (otherwise known as Japanese-style or Panko-style breading crumbs), which are characterized by an elongate shape and a coarse splintered appearance. Preferably, the oriental-style breading crumbs are those produced by the procedure described in U.S. Pat. No. 4,423,078, assigned to the assignee herein and the disclosure of which is incorporated herein by reference.

Breading crumbs preferably employed in the present invention are characterized by an amylograph of the following characteristics:

|  | Brabender Units |
| --- | --- |
| Initial Cold Viscosity | 10 to 50 |
| Peak Viscosity at 95° C. | 600 to 1000 |
| Minimum Viscosity after 15 min hold | 500 to 800 |
| Final Cold Viscosity | 1800 to 2500. |

The amylograph is determined on a Brabender Amylograph unit using 60 g of breading crumbs ground to pass a 30-mesh screen but to be retained on an 80-mesh screen, added to 450 ml of water with a bowl speed of 75 rpm and a sensing head value of 700 cmg. The oriental-style breading crumbs produced by the process of the aforementioned U.S. Pat. No. 4,423,078 meet these requirements.

The components of the coating composition are chosen to provide an overall controlled degree of porosity in order to retain some moistness but to release the excess generated during reheating. The proportions of the three components of the coating composition required to achieve this result may vary widely, depending on the identity of the food substrate. Typical food substrates to which the compositions of the invention may be applied include fish, seafood, poultry, red meat and vegetables. Usually, the food substrate comprises about 50 to about 75 wt% of the overall composition with the coating compositions comprising the balance of about 25 to about 50 wt% of the composition.

For fish portions, the coating composition may comprise about 25 to about 35 wt.% of the total food composition, with the predust being about 1 to about 5 wt.%, the wet batter being about 15 to about 20 wt.% and the breading being about 6 to about 10 wt.% of the total food composition.

For small fish pieces or seafood items, e.g. shrimps, the total coating composition may comprise about 40 to about 50 wt.% of the total food composition, with the predust being about 1 to about 5 wt.%, the wet batter being about 25 to about 35 wt.% and the breading being about 10 to about 15 wt.% of the total food composition.

For chicken patties, the total coating composition may comprise about 25 to about 40 wt.% of the total food composition, with the predust being about 1 to about 5 wt.%, the wet batter being about 15 to about 25 wt.% and the breading being about 6 to about 10 wt.% of the total food composition.

For chicken parts, the total coating composition may comprise about 20 to about 35 wt.% of the total food composition with the predust being about 1 to about 5 wt.%, the wet batter being about 10 to about 20 wt.% and the breading being about 5 to about 10 wt.% of the total food composition.

In the practice of the invention, the three layers are successively applied to the food substrate, which may be raw or partially or wholly precooked, and the food product then is frozen, after blanch frying or similar treatment, if desired.

The food products which are produced using the coating composition of the invention are cookable by microwave energy to the desired textures of crispness within the coating and moistness within the food. In panel testing, sample food products have been determined to have similar organoleptic properties to infrared reheated breaded food products. This result has not previously been attained for microwave-reconstituted breaded food products. The products also resist thermal freezer cycle stress.

Reheating of the food product for serving is not restricted to microwave reheating but also may be effected by conventional infrared oven heating, if desired. The conditions of reheating depend on the type and weight of food chosen and the mode of reheating chosen, but are generally those used for other similar food products.

EXAMPLES

Example 1

This Example illustrates the provision of a frozen fish portion having a coating composition applied thereto and the reconstitution thereof.

Three oz (85 g) filleted cod portions were cut diagonally in half through the largest plane to create wedge portions. The portions were tempered to eliminate any surface ice glaze.

Three successive layers were applied to each of the cod portions to provide a coating composition over the exterior surfaces thereof. A predust composition was first applied by hand to achieve a light coating with no clumps. The predusted fish portion was dipped into a batter by hand and partially dried. An outer layer of breading crumbs was applied by hand to the battered fish portion.

The predust used in the application of the coating composition comprised the following components:

| Ingredient | wt. % |
| --- | --- |
| Ground white pepper | 0.125 |
| Egg albumen | 8.00 |
| Biscrum fine[1] | 40.00 |
| Flour, PF-43[2] | 41.875 |
| Flour, Pastry type S[3] | 10.00 |
| | 100.00 |

Notes:
[1]Biscrum fine is a finely-divided dense breading crumb which has the following typical characteristics:
Screen Specification:

| U.S. mesh | Wt. % |
| --- | --- |
| +10 | 0 |
| +20 | 5 to 15 |
| +40 | 30 to 40 |
| +60 | 20 to 30 |
| −60 | 25 to 35 |
| Absorption rate: | 35 seconds |
| Total Absorption: | 425 to 475 |
| Salt: | none |
| Moisture: | 7 to 9 wt. % |
| Bulk density: | 0.55 to 0.66 g/cc |

[2]Flour PF-43 is a soft wheat flour with 0.44% ash maximum and 8.0 to 9.0% protein based on 14% moisture
[3]Flour, Pastry Type S is a soft wheat flour with 0.55 to 0.60% ash and 8.5 to 9.5% protein based on 14% moisture The batter used in the application of the coating composition was prepared by placing 975 g of cold tap water in a Hobart mixing bowl and adding 750 g dry batter mix. The mixing bowl contents were mixed at speed #1 (low speed) with a mixing paddle to wet the dry ingredients and then mixed at speed #2 (medium speed) until well blended and lump free, whereupon the mixing speed was decreased to #1. 90 g of creamed shortening was gradually added while the batter was continued to be mixed. When all the shortening had been added, the mixing speed was again increased to #2 until the batter was well blended, smooth and lump free.

The dry batter mix used to form the batter comprised:

| Ingredient | wt. % |
| --- | --- |
| Powdered lemon juice | 0.50 |
| Pyran[1] | 2.40 |
| Granulated sodium bicarbonate | 2.00 |
| Egg albumen | 3.00 |
| Fine cane sugar | 3.00 |
| Salt | 6.00 |
| Defatted soya flour | 1.60 |
| Velvet Flour[2] | 56.50 |
| Crisp Film Starch[3] | 25.00 |
| | 100.00 |

Notes:
[1]Pyran is an anhydrous monobasic calcium phosphate
[2]Velvet Flour is a soft wheat flour with 0.35 wt. % ash maximum and 7 to 7.5 wt. % protein based on 14 wt. % moisture
[3]Crisp Film Starch is a modified corn starch supplied by National Starches of Bridgewater, N.J., U.S.A.

The creamed shortening was prepared by mixing Biscot shortening, a general purpose vegetable shortening, on a Hobart mixer at speed #3 (high speed) for approximately five minutes. The specification of the Biscot shortening used was as follows:

| Free fatty acids (%) | 0.05 max |
| --- | --- |
| Peroxide value (me/kg) | 0.5 max |
| Solid Fat Index | |
| At 10° C. | Approx. 24 |

| -continued | |
|---|---|
| At 26.7° C. | Approx. 18 |
| At 40.5° C. | Approx. 8 |

The outer breading crumbs were white splinter-shaped oriental-style breading crumbs with a medium browning rate and very crisp texture. The breading crumb had the following characteristics:

| Screen Specification: | |
|---|---|
| Mesh | Wt. % |
| +5 | max. 1.0 |
| +8 | 25 to 35 |
| +14 | 25 to 35 |
| +20 | 20 to 30 |
| +40 | 5 to 15 |
| −40 | max 10 |
| Absorption rate: | 65 secs |
| Total Absorption: | 613 |
| Salt: | 0.8 to 1.2 wt. % |
| Moisture: | 7 to 9 wt. % |
| Bulk density: | 0.33 to 0.36 g/cc |

The coated product was blanch fried for 45 seconds at 390° F. (200° C.) using a general purpose vegetable oil shortening in a restaurant-style fryer. The product was weighed to determine the amount of pick-up, i.e.

$$\frac{\text{Final wt} - \text{Raw wt}}{\text{Final wt}} \times 100,$$

which was 33.6 wt.%, before being frozen on trays in an upright home freezer run at 2° to 5° F. (−16° to −15° C.). Once frozen, the coated portions were packed in a lidded aluminum foil tray and were held in an upright or chest-style home freezer at 2° F. to 5° F. (−16° to −15° C.).

The frozen product was reconstituted on a microwave browning grill preheated for 4 minutes at high power (700 watts) by adding two of the coated fish portions, and cooking the portions for two minutes on each side at high power. The cooked product was left to stand for 5 minutes prior to serving.

The product was judged to have a crispy exterior and moist cooked interior fish portions and to be comparable to commercially-available products reconstituted by convection oven heat.

Example 2

This Example illustrates the provision of a frozen water-cooked chicken portion having a coating composition applied thereto and the reconstitution thereof.

Chicken thighs (bone-in, skin-on) were employed in this test. The chicken thighs were placed in water and boiled for 20 minutes. The boiled chicken thighs were washed with hot water and repeatedly rinsed in gradually decreasing temperature to cold water. The cooked chicken thighs were cooled in tap water and drained on paper towelling.

Three successive layers were applied to the water-cooked chicken thighs to provide a coating composition over the exterior surfaces thereof, following the procedure outlined in Example 1.

The predust composition used was that described in Example 1 and was applied as described therein.

The batter used in the coating composition was prepared as described in Example 1 from 975 g of cold tap water, 750 g dry batter mix and 90 g of creamed shortening.

The dry batter mix used in this preparation comprised:

| Ingredient | wt. % |
|---|---|
| Black ground pepper | 0.670 |
| Liquid pepper on salt carrier | 0.500 |
| Ground celery seed | 0.500 |
| Monosodium glutamate | 1.350 |
| Onion Powder | 0.670 |
| Ground savory | 0.310 |
| Pyran | 2.40 |
| Granulated sodium bicarbonate | 2.00 |
| Egg albumen | 3.00 |
| Fine cane sugar | 1.00 |
| Salt | 5.00 |
| Defatted soya flour | 1.60 |
| Corn Starch | 25.00 |
| Flour PF-43 | 30.00 |
| Flour HW-80[1] | 26.00 |
| | 100.00 |

Notes:
[1]Flour HW-80 is a hard wheat flour with 0.5 ash maximum and 12.8 ± 0.27% protein based on 14% moisture.

The outer breading crumbs were brown-coloured splinter-shaped oriental-style breading crumb with a fast browning rate and a crisp texture. The breading crumb had the following characteristics:

| Screen Specification: | |
|---|---|
| Mesh | Wt. % |
| +5 | max. 1 |
| +8 | 20 to 30 |
| +14 | 30 to 40 |
| +20 | 20 to 30 |
| +40 | 5 to 15 |
| −40 | max. 10 |
| Salt: | 0.8 to 1.2 wt. % |
| Moisture: | 7 to 9 wt. % |
| Bulk density: | 0.23 to 0.26 g/cc |

The coated product was blanch fried, weighed, frozen, packaged and stored as described in Example 1.

The frozen product was reconstituted on a microwave browning grill preheated for 4 minutes at high power (700 watts) by adding two chicken thighs, and cooking the portions for two and a half minutes on each side at high power. The cooked product was left to stand for 5 minutes prior to serving.

The product was judged to have a crispy exterior and moist cooked chicken thighs and to be comparable to commercially-available products reconstituted by oven heat.

Example 3

This Example illustrates the provision of fully fried chicken portions having a coating composition applied thereto.

Three successive layers, comprising a predust layer, a batter layer and a breading layer, were applied to chicken thighs (bone-in, skin-on) to provide a coating composition over the exterior surfaces thereof. The predust layer has the composition described in Example 1 and is applied in the manner described therein.

The batter used in the provision of the coating composition was prepared in the manner described in Example 1 from 650 g of cold tap water, 500 g dry batter mix, and 60 g of creamed shortening.

The dry batter mix used in this preparation comprised:

| Ingredient | wt. % |
| --- | --- |
| Liquid pepper on salt carrier | 1.25 |
| Celery powder on salt carrier | 0.50 |
| Onion powder on salt carrier | 0.70 |
| Ground savory on salt carrier | 0.30 |
| Monosodium glutamate | 1.35 |
| Pyran | 2.40 |
| Granulated sodium bicarbonate | 2.00 |
| Egg albumen | 3.00 |
| Salt | 3.00 |
| Defatted soya flour | 1.60 |
| Flour PF-43 | 32.90 |
| Flour HW-80 | 26.00 |
| Corn starch | 25.00 |
| | 100.00 |

The creamed shortening was prepared as described in Example 1 from Biscot shortening.

The outer breading crumbs were very white coloured, splinter-shaped oriental-style breading crumb with a very slow browning rate and tender fried texture. The breading crumb had the following characteristics:

| Screen Specification: | |
| --- | --- |
| Mesh | Wt. % |
| +5 | max. 1 |
| +8 | 20 to 30 |
| +14 | 30 to 40 |
| +20 | 20 to 30 |
| +40 | 5 to 15 |
| −40 | max. 10 |
| Absorption rate: | 35 secs |
| Total Absorption: | 733 |
| Salt: | 0.8 to 1.2 wt. % |
| Moisture: | 7 to 9 wt. % |
| Bulk density: | 0.25 to 0.30 g/cc |

The coated product was fully fried at 350° F. (170° C.), frozen for 24 hours, packaged and stored as described in Example 1.

The frozen product was reconstituted on a microwave browning grill, preheated for 4 minutes at high power (700 watts), by adding two thigh portions and cooking the portions for two minutes on each side at high power. The cooked product was left to stand for 5 minutes prior to serving.

The reconstituted product was judged to have a nice brown colour, a very crispy exterior and moist cooked chicken portions and to be comparable to commercially-available products reconstituted by oven heat.

Example 4

This Example illustrates the provision of chicken patties having a coating composition applied thereto.

Chicken patties having an analysis 66.7 wt.% moisture, 10.4 wt.% fat, 1.5 wt.% salt, and 20.9 wt.% protein with a dextrose equivalent of 0.5 were treated. The patties weighed 61 to 62 g.

Three successive coating layers, namely a predust layer, a batter layer and a breading layer, were applied to the patties to provide a coating composition over the exterior surfaces thereof by the procedure outlined in Example 1.

The predust composition employed was that described in Example 1 and was applied as described therein.

The batter used in this procedure was prepared by mixing a dry batter mix with cold water in an ABC Baker Mixer to achieve a Stein cup viscosity of 23 to 24 seconds. The batter mix in this case had the shortening included therein, in contrast to Examples 1 to 3.

The dry batter mix used in this preparation comprised:

| Ingredient | wt. % |
| --- | --- |
| Ground pepper | 0.60 |
| Liquid pepper on salt carrier | 0.45 |
| Ground celery seed | 0.45 |
| Onion powder | 0.60 |
| Savory powder | 0.28 |
| LevnLite[1] | 1.80 |
| Monosodium glutamate | 1.20 |
| Granulated sodium bicarbonate | 1.80 |
| Egg albumen | 2.70 |
| Fine cane sugar | 0.90 |
| Salt | 4.45 |
| Defatted soya flour | 1.42 |
| Flour PF-43 | 27.00 |
| Corn starch | 22.30 |
| Flour HW 80 | 23.35 |
| Powdered hydrogenated vegetable shortening[2] | 10.70 |
| | 100.00 |

Notes:
[1] LevnLite is an acidic sodium aluminum phosphate;
[2] The powdered hydrogenated vegetable shortening was an cryogenically crystallized powdered shortening having the following characteristics:

| | |
| --- | --- |
| Free fatty acids | 0.1% max. |
| Peroxide Value (me/kg) | 0.5 max. |
| Iodine value | 50 to 66 |
| Melting point | 46° to 56° C. |
| Moisture | 0.1% max. |
| Solid Fat Index: | |
| at 10° C. | 68 to 70 |
| at 27° C. | 62 to 68 |
| at 40° C. | 34 to 38 |

The outer breading crumbs were brown-coloured, splinter-shaped oriental-style breading crumb with a fast browning rate and medium-crisp fried texture. The breading crumb had the following characteristics:

| Screen Specification: | |
| --- | --- |
| Mesh | Wt. % |
| +5 | max. 1 |
| +8 | 20 to 30 |
| +14 | 30 to 40 |
| +20 | 20 to 30 |
| +40 | 5 to 15 |
| −40 | max. 10 |
| Absorption rate: | not known |
| Total Absorption: | not known |
| Salt: | 0.8 to 1.2 wt. % |
| Moisture: | 7 to 9 wt. % |
| Bulk density: | 0.25 to 0.28 g/cc |

The coated chicken patties were blanch fried for 31 seconds at temperatures varying from 378° to 390° F. (190° to 200° C.) using a general purpose vegetable oil shortening in a plant-style fryer. The product was weighed after frying to determine the amount of pick-up, which was 39.5 wt.%, before being frozen in a nitrogen freezing tunnel to provide a thin, soft and unfrozen layer in the centre of the patties and then placed in an upright or chest-style home freezer at 2° to 5° F. (−16° to −15° C.).

The frozen product was reconstituted on a microwave browning grill, preheated for 4 minutes at high power (700 watts), by adding two coated chicken patties and cooking the portions for two and a half minutes on each side at high power. The cooked product was left to stand for 5 minutes prior to serving. The reconstituted patties were judged to have an excellent texture (crispness) and appearance.

Example 5

This Example illustrates the provision of coated shrimps.

Frozen butterfly shrimps were coated with three successive layers, namely a predust layer, a batter layer and a breading layer, to provide a coating composition over the exterior surfaces thereof.

The predust composition was applied using a standard breading machine without vibrator or splitter to achieve a light coating with no clumps. The batter layer was applied using a standard batter applicator with submerger. The outer breading was applied using a Stein J machine.

The predust used in the coating composition was the same as that used in Example 1.

The batter used was prepared by the procedure described in Example 1 from equal parts by weight of cold tap water and dry batter mix. The dry batter mix used in this preparation comprised:

| Ingredient | wt. % |
| --- | --- |
| Powdered lemon juice | 0.45 |
| LevnLite | 1.80 |
| Granulated sodium bicarbonate | 1.80 |
| Egg albumen | 2.70 |
| Fine cane sugar | 2.70 |
| Salt | 5.35 |
| Defatted soya flour | 1.45 |
| Velvet Flour | 50.65 |
| Crisp Film Starch | 25.00 |
| Powdered hydrogenated vegetable shortening[1] | 10.70 |
| | 100.00 |

Note:
[1] The vegetable shortening used was that described in Example 4.

The outer breading crumbs were white-coloured splinter-shaped oriental-style breading crumb with a slow browning rate and a medium-crisp fried texture. The breading crumb had the following characteristics:

| Screen Specification: | |
| --- | --- |
| Mesh | Wt. % |
| +3 | 0 |
| +5 | 5 to 15 |
| +8 | 30 to 40 |
| +14 | 25 to 40 |
| +20 | 10 to 20 |
| −20 | max. 15 |
| Absorption rate: | 35 secs |
| Total Absorption: | 667 |
| Salt: | 0.8 to 1.2 wt. % |
| Moisture: | 7 to 9 wt. % |
| Bulk density: | 0.25 to 0.28 g/cc |

The coated shrimps were blanch fried for 43 seconds at a target temperature of 390° F. (200° C.) using a general purpose vegetable oil shortening in a plant-style fryer. The fried product was weighed and the amount of pick-up was determined to be 45 wt.%. The fried product was frozen in a freezer tunnel, packed in coated paperboard boxes and placed in an upright freezer.

The frozen product was reconstituted on a microwave browning grill, preheated for 3 minutes at high power (700 watts), by adding eight shrimps and cooking the portions for two minutes on one side and one and a half minutes on the other, at high power. The cooked product was left to stand for 5 minutes prior to serving.

The product was found to be overdone slightly, which could be cured by decreasing the cooking time. The coating was found to be crisp although slightly doughy.

Example 6

The procedure described in Example 1 was generally repeated for cod fish portions, except that a slowly absorbant high-density breading was substituted for the oriental-style breading as the outer layer. The breading crumbs used were a baked, yeast leavened product having a total absorption of 316 and an absorption rate of 120 secs. After 1½ weeks storage of the frozen product, reconstitution produced a cooked product in which the coating was found to be soft and unacceptable.

SUMMARY OF DISCLOSURE

In summary of this disclosure, the present invention provides a novel food coating composition which may be applied to prepared foods for reconstitution by the application of microwave energy. The coating composition has a crispy texture while the cooked food has an acceptable moisture level. Modifications are possible within the scope of this invention.

What we claim is:

1. A three component food coating composition provided in dry form, consisting essentially of:
   (a) a first particulate component sized so that none of the particles is coarser than 16 mesh and up to 40% pass an 80-mesh screen and comprising about 1 to about 10 wt.% of powdered egg albumen, up to about 60 wt.% of flour, and substantially of particulated high density breadcrumbs having a bulk density of about 0.5 to about 0.75 g/cc, a total absorption of about 375 to about 500, an absorption rate of about 15 to about 60 seconds and a moisture content of about 6 to about 10 wt.%;
   (b) a second particulate component suitable for constitution with water as a batter by the utilization of about 85 to about 125 parts by weight of water for each 100 parts by weight of said second particulate component and comprising flour, corn starch, about 1 to about 5 wt.% of chemical leavening agents and plastic fat in an amount to provide about 4 to about 10 wt.% therein in the batter, said plastic fat being in particulated form and having a sold fat index as follows:
   at 10° C.—up to about 75%
   at 27° C.—about 15 to about 75%
   at 40° C.—about 5 to about 45%; and
   (c) a third particulate component comprising low density oriental-style breadcrumbs sized at least 15 wt.% coarser than 8 mesh and having a density of about 0.20 to about 0.40 g/cc.

2. The coating composition of claim 1 wherein each component is packaged separately and the three components are supplied together.

3. The coating composition of claim 1 wherein (i) in component (a), the flour is soft wheat flour and the high density breadcrumbs have a bulk density of about 0.55 to about 0.66 g/cc, a total absorption of about 425 to about 475 and a moisture content of about 7 to about 9 wt.%; and (ii) in component (c), the oriental-style breadcrumbs have a bulk density of about 0.23 to about 0.36 g/cc, a particle size distribution as follows:

| Mesh Size | % |
| --- | --- |
| +3 | 0 |
| +5 | 0 to about 15 |
| +8 | about 20 to 40 |
| +14 | about 25 to 40 |
| +20 | about 10 to 30 |
| +40 | 0 to about 5 |
| −40 | max. 10, | an amylograph having the following characteristics:

| | Brabender Units |
| --- | --- |
| Initial Cold Viscosity | 10 to 50 |
| Peak viscosity at 95° C. | 600 to 1000 |
| Minimum viscosity after 15 min. hold | 500 to 800 |
| Final Cold viscosity | 1800 to 2500, | and contains 0 to 0.1 wt.% of colouring agent, 0 to about 2 wt.% dextrose and 0 to 5 wt.% of salt.

* * * * *